United States Patent [19]

Verlijsdonk et al.

[11] Patent Number: 4,810,930

[45] Date of Patent: Mar. 7, 1989

[54] LUMINESCENT EU³⁺-ACTIVATED SILICATE, LUMINESCENT SCREEN PROVIDED WITH SUCH A SILICATE AND LOW-PRESSURE MERCURY VAPOR DISCHARGE LAMP PROVIDED WITH SUCH A SCREEN

[75] Inventors: Johannus G. Verlijsdonk; Bruno M. J. Smets; Joseph Rutten, all of Eindhoven, Netherlands

[73] Assignee: U.S. Philips Corporation, New York, N.Y.

[21] Appl. No.: 226,100

[22] Filed: Jul. 29, 1988

[30] Foreign Application Priority Data

Aug. 17, 1987 [NL] Netherlands .................... 8701924

[51] Int. Cl.⁴ ............................................. C09K 11/79
[52] U.S. Cl. ............................... 313/486; 252/301.4 F; 428/690
[58] Field of Search ................. 252/301.4 F; 428/690; 313/486

[56] References Cited

U.S. PATENT DOCUMENTS

| | | | |
|---|---|---|---|
| 3,400,081 | 9/1968 | Brixner | 252/301.4 F |
| 3,523,091 | 8/1970 | McAllister | 252/301.4 F |
| 3,650,974 | 3/1972 | Ward | 252/301.4 F |
| 3,897,359 | 7/1975 | Kobayashi | 252/301.4 F |
| 4,128,498 | 12/1978 | Hase et al. | 252/301.4 F |
| 4,315,191 | 2/1982 | Konijnendijk et al. | 252/301.4 F |
| 4,354,139 | 10/1982 | Konijnendijk et al. | 313/486 |
| 4,748,391 | 5/1988 | Sigai et al. | 252/301.4 F |

*Primary Examiner*—Jack Cooper
*Attorney, Agent, or Firm*—John C. Fox

[57] ABSTRACT

Luminescent Eu³⁺-activated alkaline earth metal-rare earth metal silicate, which is defined by the formula $Ba_2Gd_{2-x-y}Y_xEu_ySi_{4-z}Ge_zO_{13}$, in which $0 \leq x \leq 1.3$, $0.01 \leq y \leq 1.0$ and $0 \leq z \leq 4$, luminescent screen provided with such a silicate and low-pressure mercury vapor discharge lamp provided with such a screen.

9 Claims, 1 Drawing Sheet

LUMINESCENT $Eu^{3+}$-ACTIVATED SILICATE, LUMINESCENT SCREEN PROVIDED WITH SUCH A SILICATE AND LOW-PRESSURE MERCURY VAPOR DISCHARGE LAMP PROVIDED WITH SUCH A SCREEN

BACKGROUND OF THE INVENTION

The invention relates to a luminescent $Eu^{3+}$-activated alkaline earth metal-rare earth metal silicate. The invention also relates to a luminescent screen comprising such a luminescent silicate and to a low-pressure mercury vapour discharge lamp provided with such a luminescent screen.

Luminescent silicates of an alkaline earth metal and of a rare earth metal, which silicates also comprise a halogen, are known from U.S. Pat. No. 3,650,974. These halosilicates have the crystal structure of the mineral apatite. A calcium-yttrium fluorosilicate is shown as an example of an $Eu^{3+}$-activated material. This $Eu^{3+}$-activated silicate has the characteristic red $Eu^{3+}$ emission upon excitation by ultraviolet radiation. The light output of this silicate is, however, considerably smaller than that of $Eu^{3+}$-activated $Y_2O_3$. $Eu^{3+}$-activated $Y_2O_3$ is a very efficient red luminescing material which is frequently used in practice but which has the drawback of being very expensive. Therefore constant research is being done for less expensive efficient red luminescing materials.

It is to be noted that a rare earth metal silicate defined by the formula $Ba_2Nd_2Si_4O_{13}$ is known from Dokl. Akad. Nauk SSSR, 285(1), pages 124-128, 1985. This silicate has a triclinic crystal structure. Nothing is known about possibilities of activating this silicate for the purpose of obtaining a luminescent material.

OBJECTS AND SUMMARY OF THE INVENTION

An object of the invention is to provide a novel red luminescing material which is suitable for practical uses, particularly in low-pressure mercury vapour discharge lamps.

According to the invention a luminescent $Eu^{3+}$-activated alkaline earth metal-rare earth metal silicate is characterized in that the silicate is defined by the formula

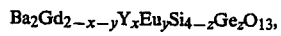

$$Ba_2Gd_{2-x-y}Y_xEu_ySi_{4-z}Ge_zO_{13},$$

wherein $0 \leq x \leq 1.3$, $0.01 \leq y \leq 1.0$ and $0 \leq z \leq 4$.

A silicate defined by the formula $Ba_2Gd_2Si_4O_{13}$ is a novel material having a monoclinic crystal structure. This monoclinic crystal structure is maintained if up to a maximum of 65 atom% ($0 \leq x \leq 1.3$) of the gadolinium is replaced by yttrium. It has also been found that the silicon can be completely replaced by germanium ($0 \leq z \leq 4$)) while maintaining the crystal structure. Replacement of the barium by strontium and/or calcium and of the gadolinium by lanthanum is only possible to a very limited extent (at most approximately 5 atom%), because unwanted side phases with different crystal structures are created in the case of larger quantities.

If the novel silicate lattice is activated by trivalent europium, excitation by ultraviolet radiation results in absorption of this radiation followed by emission of the characteristic red $Eu^{3+}$ radiation. The excitation maximum for the pure silicates is situated at approximately 235 nm. For use in a low-pressure mercury vapour discharge lamp it is desirable that the excitation maximum is situated at approximately 254 nm because the mercury resonance radiation is located at this wavelength. For the luminescent silicates according to the invention, the relative quantum efficiency at 254 nm is approximately 70% of the maximum value at approximately 235 nm. By substituting germanium for silicon, the excitation maximum shifts towards 254 nm. If the silicon is entirely replaced by germanium, the excitation maximum is situated at approximately 250 nm. The relative quantum efficiency at 254 nm is then approximately 95% of the maximum value.

In the above-defined formula y denotes the quantity of europium by which the silicate is activated. y may assume a value of between 0.01 and 1.0. If y is chosen to be smaller than 0.01, the absorption of exciting UV radiation is too small and at values of y of more than 1.0, the light output becomes too small due to concentration quenching.

A practical embodiment of a luminescent silicate according to the invention is characterized in that $0.1 \leq y \leq 0.5$, within which range luminescent $Eu^{3+}$-activated silicates according to the invention have a good UV absorption A and a high quantum efficiency Q, i.e., $A \geq 65\%$ and $Q \geq 70\%$, at 254 mm radiation.

A preferred embodiment of a luminescent silicate according to the invention is characterized in that $1.5 \leq z \leq 2.5$. Tests have proved that UV absorptions of 70% and quantum efficiencies of 80% at 245 nm wavelength of exciting radiation are possible if approximately half the silicon in the silicate is replaced by germanium.

A further preferred embodiment of a luminescent silicate according to the invention is characterized in that $0.5 \leq x \leq 1$. Experiments have proved that the most efficiently luminescent materials are obtained if 25 to 50 atom% of the gadolinium is replaced by yttrium.

The luminescent silicates according to the invention are particularly suitable for use in the luminescent screen of low-pressure mercury vapour discharge lamps.

The luminescent silicates according to the invention may be obtained by a solid state reaction at a high temperature. The starting material is a mixture of the composite oxides or of compounds yielding these oxides at elevated temperatures. The starting mixture, which may comprise $SiO_2$ in excess (for example up to 10 mol. %) for promoting the formation reaction, is heated once or several times at 1200° to 1400° C. in an oxidizing atmosphere. The formation of the silicates can be further promoted by using a flux.

Embodiments of luminescent silicates and low-pressure mercury vapour discharge lamps according to the invention will now be further described in greater detail by way of example with reference to the accompanying drawing and a number of examples of preparation.

DESCRIPTION OF THE PREFERRED EMBODIMENTS

Figure 1:
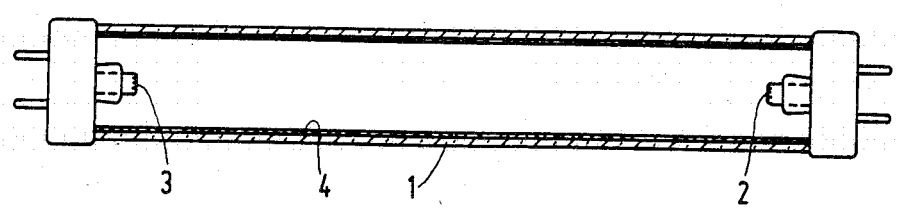
FIG. 1 shows a low-pressure mercury vapour discharge lamp provided with a luminescent screen comprising a luminescent $Eu^{3+}$-activated silicate according to the invention and FIG. 2 shows the spectral energy distribution of the emitted radiation of two silicates according to the invention.

FIG. 1 shows in a diagrammatic cross-section a low pressure mercury vapour discharge lamp having a tubular glass wall 1. Electrodes 2 and 3, between which the discharge is maintained during operation, are arranged at the ends of the lamp. The lamp contains a small quantity of mercury and a rare gas as a starter gas. The wall 1 serves as a support for the luminescent layer 4 comprising a luminescent $Eu^{3+}$-activated silicate according to the invention, wall 1 and layer 4 constituting a luminescent screen. The layer 4 may be provided on the wall 1 in a conventional manner, for example by coating the wall with a suspension comprising the luminescent material.

EXAMPLE 1

A mixture was made of
5.131 g of $BaCO_3$
1.885 g of $Gd_2O_3$
1.468 g of $Y_2O_3$
1.582 g of $SiO_2$
2.719 g of $GeO_2$
0.457 g of $Eu_2O_3$ This mixture, which comprises 2.5 mol. % of $SiO_2$ in excess, was heated twice at a temperature of approximately 1325° C. for 1 hour. This heat treatment took place in an oxidizing atmosphere, namely air. The silicate thus obtained, defined by the formula $$Ba_2Gd_{0.8}YEu_{0.2}Si_2Ge_2O_{13},$$

had a quantum efficiency Q of 86% and a UV absorption of 71% at 254 nm exciting radiation.

EXAMPLES 2 TO 15

Figure 2:
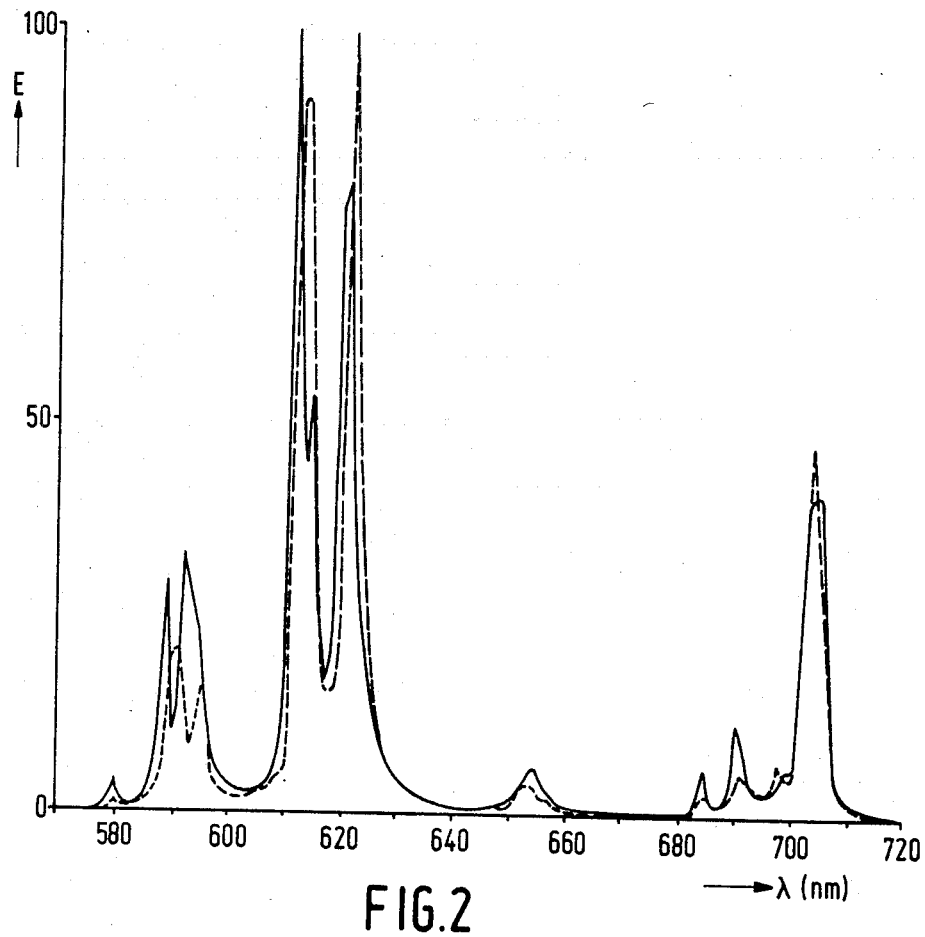

In a corresponding manner to that described in Example 1, a number of silicates were prepared in which the germanium content, the yttrium content and the europium content were varied. Only one heat treatment at 1325° C. was carried out for the Examples 10, 11 and 12. For the Examples 13, 14 and 15 the first heat treatment took place at 1325° C. and the second heat treatment took place at 1350° C. The Table below indicates the formula of the silicates, the quantum efficiency Q (in %) and the UV absorption A (in %) at 254 nm radiation. FIG. 2 shows the emission spectrum for the silicates according to Examples 3 (solid line) and 8 (broken line). In this Figure the wavelength λ is plotted (in nm) on the horizontal axis and the emitted radiation energy E is plotted (in arbitrary units) on the vertical axis.

TABLE

| ex. | formula | Q (in %) | A (in %) |
|---|---|---|---|
| 1. | $Ba_2Gd_{0.8}YEu_{0.2}Ge_2Si_2O_{13}$ | 86 | 71 |
| 2. | $Ba_2Gd_{0.6}YEu_{0.4}Si_2Ge_2O_{13}$ | 75 | 77 |
| 3. | $Ba_2Gd_{1.8}Eu_{0.2}Si_4O_{13}$ | 77 | 67 |
| 4. | $Ba_2Ge_{1.8}Eu_{0.2}Si_{3.5}Ge_{0.5}O_{13}$ | 77 | 69 |
| 5. | $Ba_2Gd_{1.8}Eu_{0.2}Si_3GeO_{13}$ | 79 | 70 |
| 6. | $Ba_2Gd_{1.8}Eu_{0.2}Si_2Ge_2O_{13}$ | 80 | 69 |
| 7. | $Ba_2Gd_{1.8}Eu_{0.2}SiGe_3O_{13}$ | 79 | 69 |
| 8. | $Ba_2Gd_{1.8}Eu_{0.2}Ge_4O_{13}$ | 82 | 72 |
| 9. | $Ba_2Gd_{1.6}Eu_{0.4}Ge_4O_{13}$ | 70 | 79 |
| 10. | $Ba_2Gd_{1.8}Eu_{0.2}Si_4O_{13}$ | 71 | 68 |
| 11. | $Ba_2Gd_{1.3}Y_{0.5}Eu_{0.2}Si_4O_{13}$ | 72 | 66 |
| 12. | $Ba_2Gd_{0.8}YEu_{0.2}Si_4O_{13}$ | 66 | 65 |
| 13. | $Ba_2Gd_{1.8}Eu_{0.2}Si_4O_{13}$ | 80 | 66 |
| 14. | $Ba_2Gd_{1.7}Eu_{0.3}Si_4O_{13}$ | 80 | 71 |
| 15. | $Ba_2Gd_{1.6}Eu_{0.4}Si_4O_{13}$ | 78 | 72 |

A number of lamps of the type described with reference to FIG. 1 (36 W type) were provided with a luminescent layer comprising $Ba_2Gd_{1.7}Eu_{0.3}Si_4O_{13}$, the composition of Example 14. These lamps had an average initial luminous flux of 41 lm/W.

What is claimed is:

1. A luminescent $Eu^{3+}$-activated alkaline earth metal-rare earth metal silicate, characterized in that the silicate is defined by the formula $$Ba_2Gd_{2-x-y}Y_xEu_ySi_{4-z}Ge_zO_{13},$$

in which $0 \leq x \leq 1.3$, $0.01 \leq y \leq 1.0$ and $0 \leq z \leq 4$.

2. A luminescent silicate as claimed in claim 1, characterized in that $0.1 \leq y \leq 0.5$.

3. A luminescent silicate as claimed in claim 2, characterized in that $1.5 \leq z \leq 2.5$.

4. A luminescent silicate as claimed in claim 2, characterized in that $0.5 \leq x \leq 1$.

5. A luminescent silicate as claimed in claim 1, characterized in that $1.5 \leq z \leq 2.5$.

6. A luminescent silicate as claimed in claim 5, characterized in that $0.5 \leq x \leq 1$.

7. A luminescent silicate as claimed in claim 1, characterized in that $0.5 \leq x \leq 1$.

8. A luminescent screen comprising a luminescent silicate as claimed in claim 1 on a support.

9. A low-pressure mercury vapour discharge lamp provided with a luminescent screen as claimed in claim 8.

* * * * *